(12) United States Patent
De Roche

(10) Patent No.: US 8,056,866 B2
(45) Date of Patent: Nov. 15, 2011

(54) AIR-VEHICLE AUGMENTED KINESTHETIC CONTROL SYSTEM

(75) Inventor: Mark Stephen De Roche, Playa del Rey, CA (US)

(73) Assignee: Aerofex, Inc., Manhattan Beach, CA (US)

( * ) Notice: Subject to any disclaimer, the term of this patent is extended or adjusted under 35 U.S.C. 154(b) by 1045 days.

(21) Appl. No.: 11/900,147

(22) Filed: Sep. 10, 2007

(65) Prior Publication Data

US 2010/0327122 A1 Dec. 30, 2010

Related U.S. Application Data

(60) Provisional application No. 60/848,258, filed on Sep. 28, 2006.

(51) Int. Cl.
*B64C 13/00* (2006.01)
(52) U.S. Cl. .......... 244/221; 244/6; 244/12.3; 244/12.5; 244/17.25; 244/23 B
(58) Field of Classification Search .............. 244/6, 7 A, 244/7 B, 12.1–12.5, 13, 17.25, 23 A–23 R
See application file for complete search history.

(56) References Cited

U.S. PATENT DOCUMENTS

| | | | |
|---|---|---|---|
| 2,417,896 A | 3/1947 | Zimmerman | |
| 2,953,321 A | 9/1960 | Robertson et al. | |
| 2,955,780 A * | 10/1960 | Hulbert | 244/23 R |
| 3,184,183 A * | 5/1965 | Plasecki | 244/23 R |
| 3,726,497 A | 4/1973 | Gannett et al. | |
| 5,738,302 A * | 4/1998 | Freeland | 244/23 R |
| 5,890,441 A * | 4/1999 | Swinson et al. | 244/12.3 |
| 6,464,166 B1 * | 10/2002 | Yoeli | 244/12.1 |
| 6,488,232 B2 * | 12/2002 | Moshier | 244/4 A |
| 6,550,563 B2 * | 4/2003 | Velke et al. | 180/333 |
| 6,659,403 B2 * | 12/2003 | Hsia | 244/123.11 |
| 6,745,977 B1 * | 6/2004 | Long et al. | 244/2 |
| 6,883,748 B2 * | 4/2005 | Yoeli | 244/12.3 |
| 6,886,776 B2 * | 5/2005 | Wagner et al. | 244/12.4 |
| 6,892,979 B2 * | 5/2005 | Milde, Jr. | 244/12.3 |
| 7,249,732 B2 * | 7/2007 | Sanders et al. | 244/23 A |
| 2004/0104303 A1 * | 6/2004 | Mao | 244/12.5 |
| 2005/0230524 A1 * | 10/2005 | Ishiba | 244/23 A |

OTHER PUBLICATIONS

Zimmerman Flying Platform, http://www.nasm.si.edu/research/aero/aircraft/zimmerman.htm, Sep. 4, 2007, pp. 1-2.
Hiller Flying Platform (Model 1031-A-1), http://www.nasm.si.edu/research/aero/aircraft/hiller.htm, Sep. 4, 2007, pp. 1-3.

(Continued)

*Primary Examiner* — Tien Dinh
*Assistant Examiner* — Justin Benedik
(74) *Attorney, Agent, or Firm* — Patent Law Office of David G. Beck (57) ABSTRACT

An augmented kinesthetic control system for use with a lift platform, the lift platform comprising first and second longitudinally-spaced thrust generating means, is provided. The first and second lift planes defined by the first and second thrust generating means are positioned below the lift platform center of gravity. The kinesthetic control means are coupled to means for aerodynamically altering the air flow from the first and second thrust generating means such that the intuitive and balancing movements of the pilot are magnified to allow kinesthetic control of a vehicle of greater size and utility.

19 Claims, 9 Drawing Sheets

OTHER PUBLICATIONS

The De Lackner Aerocycle—An Early "Flying Platform", http://www.transchool.eustis.army.mil/Museum/DeLacker.htm, Sep. 4, 2007, pp. 1-3.

History—Flying Geeps—Model PA-59K, http://www.piasecki.com/pa-59k.htm, Sep. 4, 2007, p. 1.

History—Flying Geeps—Model PA-59H, http://www.piasecki.com/pa-59h.htm, Sep. 4, 2007, p. 1.

History—Flying Geeps—Model PA-59N, http://www.piasecki.com/pa-59n.htm, Sep. 4, 2007, p. 1.

Robertson, Designing and Testing the Hiller Platform, Aero Digest, Nov. 1955, pp. 22-26.

The Sky-High Invention, http://www.howtoadvice.com/Sky-High, Sep. 4, 2007, pp. 1-11.

And Now for Something Really Unusual . . . the 1955 de Lackner CH-4 Heli-Vector Prototype, http://findarticles.com/p/articles/mi$_{13}$ qa3897/is_200110/ai_n8968912, Sep. 4, 2007, pp. 1-3.

Robb, Driving on Air: $20^{th}$ Century Flying Carpets, Vertiflite, Spring 2005, pp. 2-11.

* cited by examiner

AIR-VEHICLE AUGMENTED KINESTHETIC CONTROL SYSTEM

CROSS-REFERENCES TO RELATED APPLICATIONS

This application claims the benefit of U.S. Provisional Patent Application Ser. No. 60/848,258, filed Sep. 28, 2006, the entire disclosure of which is incorporated herein by reference for any and all purposes.

FIELD OF THE INVENTION

The present invention relates generally to powered lift platforms and, more particularly, to an augmented kinesthetic control system for use with a powered lift platform.

BACKGROUND OF THE INVENTION

An aircraft kinesthetic control system uses the intuitive balancing capability of the pilot to stabilize the aircraft as well a provide directional control, thereby reducing and/or eliminating the complex, non-intuitive control systems typically used to provide aircraft control. Thus kinesthetic control systems offer the promise of minimizing pilot training and providing flight opportunities to non-classically trained personnel.

U.S. Pat. No. 2,417,896 discloses an early flying craft that utilizes a kinesthetic control system. As disclosed, the flying craft uses a pair of duct-enclosed, motor driven propellers. The ducts are linked together in such a way as to maintain duct spacing while still allowing the ducts to be freely, and independently, angled. During operation and flight, the pilot stands on top of the pair of ducted propellers, placing one foot on each of a pair of support plates, the support plates being mounted to the top of each of the duct housings. Additional craft control is provided by a pair of hand-held controls which provide independent control of the speed of the two engines and/or the pitch of the two propellers.

U.S. Pat. No. 2,953,321 discloses another flying craft utilizing a kinesthetic control system, this craft using a pair of axially-aligned, counter-rotating propellers. The pilot station is positioned over the cylindrical propeller housing and along the longitudinal axis of the craft, thereby minimizing pilot effort when controlling craft flight. The pilot also controls the engine output, and thus the thrust of the craft, in order to control ascent, descent and horizontal speed.

Although a variety of flying crafts have been designed which employ kinesthetic control systems, their weight and subsequent utility are limited. Accordingly, what is needed in the art is a powered lift platform with an effective kinesthetic control system. The present invention provides a platform and system that overcomes these limitations.

SUMMARY OF THE INVENTION

The present invention provides an augmented kinesthetic control system for use with a lift platform, the lift platform comprising first and second longitudinally-spaced thrust generating means, wherein the first and second lift planes defined by the first and second thrust generating means are positioned below the lift platform center of gravity. The kinesthetic control means are coupled to means for aerodynamically altering the air flow from the first and second thrust generating means such that the kinesthetic control means in a first position induces lift platform downward pitch, the kinesthetic control means in a second position induces lift platform upward pitch, the kinesthetic control means in a third position induces lift platform yaw left movement, and the kinesthetic control means in a fourth position induces lift platform yaw right movement. Lift platform roll left movement is induced when the kinesthetic control means are in the third position and the lift platform center of gravity is shifted to the left side of the lift platform centerline. Lift platform roll right movement is induced when the kinesthetic control means are in the fourth position and the lift platform center of gravity is shifted to the right side of the lift platform centerline.

In one embodiment of the invention, the lift platform is comprised of a fore-mounted, duct-enclosed rotor and an aft-mounted, duct-enclosed rotor, the rotors being longitudinally spaced, centered along the lift platform centerline and positioned such that the lift planes defined by the fore-mounted and aft-mounted rotors are below the lift platform center of gravity. Preferably the rotors are canted in-line along the lift platform centerline (i.e., the longitudinal axis of the lift platform). The system is further comprised of a first airflow controlling means which corresponds to the fore-mounted rotor and duct, and a second airflow controlling means which corresponds to the aft-mounted rotor and duct. Preferably the airflow controlling means are comprised of a pair of airflow control surfaces per duct, for example control surfaces that extend radially from the duct axis, and preferably angled away from the lift platform lateral axis. The system is further comprised of a first control handle bar and a second control handle bar, wherein the first control handle bar is located to the left of the lift platform centerline and the second control handle bar is located to the right of the lift platform centerline, wherein the first and second control handle bars are coupled to the first and second airflow controlling means, wherein the first and second control handle bars are configured to allow forward handle movement and backward handle movement from a neutral handle position, wherein lift platform downward pitch is induced when the first and second control handle bars are moved forward of the neutral position, wherein lift platform upward pitch is induced when the first and second control handle bars are moved backward from the neutral position, wherein lift platform yaw right is induced when the first control handle bar is moved forward of the neutral position and the second control handle bar is moved backward from the neutral position, wherein lift platform yaw left is induced when the first control handle bar is moved backward from the neutral position and the second control handle bar is moved forward of the neutral position, wherein lift platform roll right is induced when the first control handle bar is moved forward of the neutral position and the second control handle bar is moved backward from the neutral position and the pilot/vehicle center of gravity is shifted to the right of the lift platform centerline, and wherein lift platform yaw left is induced when the first control handle bar is moved backward from the neutral position and the second control handle bar is moved forward of the neutral position and the pilot/vehicle center of gravity is shifted to the left of the lift platform centerline. Preferably the first and second control handle bars are configured to be adjustable between a first, lower position and a second, upper position. Preferably a single drive system is coupled to both the first and second rotors, the first and second rotors are fixed pitch rotors, and a drive system cowling defines a pilot seating region.

In another embodiment of the invention, the lift platform is comprised of a fore-mounted, duct-enclosed rotor and an aft-mounted, duct-enclosed rotor, the rotors being longitudinally spaced, centered along the lift platform centerline and positioned such that the lift planes defined by the fore-mounted and aft-mounted rotors are below the lift platform center of gravity. Preferably the rotors are canted in-line along the lift platform centerline (i.e., the longitudinal axis of the lift platform). The system is further comprised of a first airflow controlling means which corresponds to the fore-mounted rotor and duct, and a second airflow controlling means which corresponds to the aft-mounted rotor and duct. Preferably the airflow controlling means are comprised of a pair of airflow control surfaces per duct, for example control surfaces that extend radially from the duct axis, and preferably angled away from the lift platform lateral axis. The system is further comprised of a first control handle bar and a second control handle bar, wherein the first control handle bar is located to the left of the lift platform centerline and the second control handle bar is located to the right of the lift platform centerline, wherein the first and second control handle bars are coupled to the first and second airflow controlling means, wherein the first and second control handle bars are configured to allow forward twisting motion and backward twisting motion from a neutral handle position, wherein lift platform downward pitch is induced when the first and second control handle bars are twisted forward from the neutral position, wherein lift platform upward pitch is induced when the first and second control handle bars are twisted backward from the neutral position, wherein lift platform yaw right is induced when the first control handle bar is twisted forward from the neutral position and the second control handle bar is twisted backward from the neutral position, wherein lift platform yaw left is induced when the first control handle bar is twisted backward from the neutral position and the second control handle bar is twisted forward from the neutral position, wherein lift platform roll right is induced when the first control handle bar is twisted forward from the neutral position and the second control handle bar is twisted backward from the neutral position and the pilot/vehicle center of gravity is shifted to the right of the lift platform centerline, and wherein lift platform yaw left is induced when the first control handle bar is twisted backward from the neutral position and the second control handle bar is twisted forward from the neutral position and the pilot/vehicle center of gravity is shifted to the left of the lift platform centerline. Preferably the first and second control handle bars are configured to be adjustable between a first, lower position and a second, upper position. Preferably a single drive system is coupled to both the first and second rotors, the first and second rotors are fixed pitch rotors, and a drive system cowling defines a pilot seating region.

A further understanding of the nature and advantages of the present invention may be realized by reference to the remaining portions of the specification and the drawings.

DESCRIPTION OF THE SPECIFIC EMBODIMENTS

Figure 1:
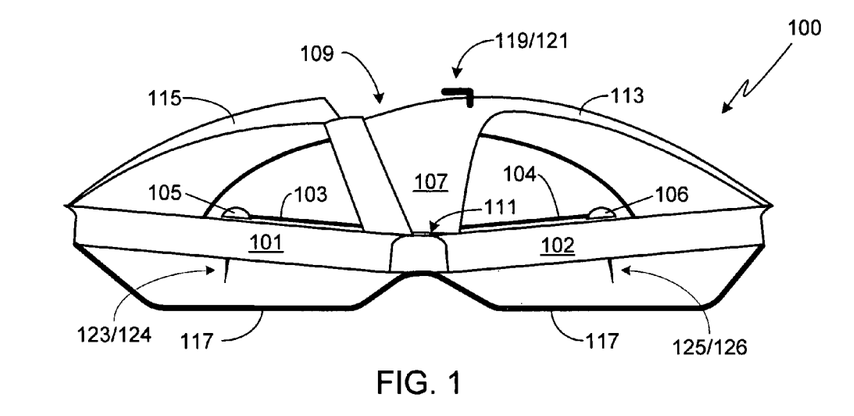
FIG. 1 is a side view of a lift platform in accordance with the present invention.
Figure 2:
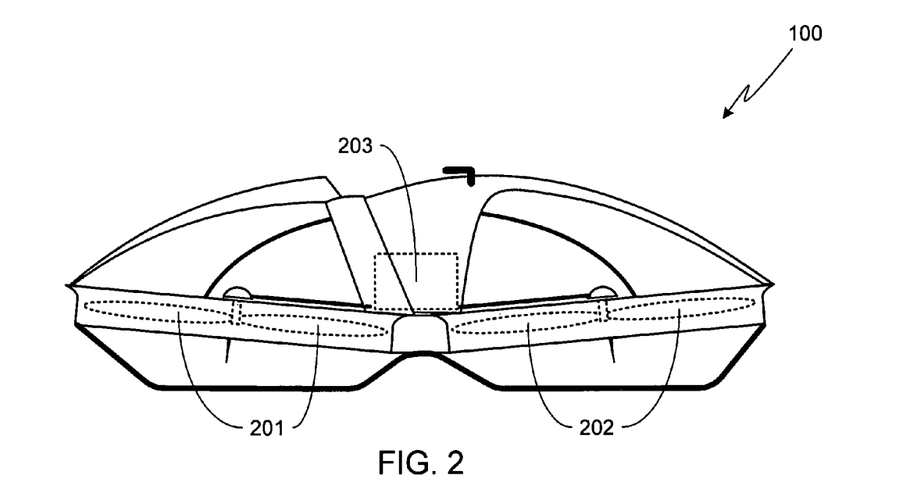
FIG. 2 is the same view of the lift platform shown in FIG. 1, with the rotors and the drive system shown in phantom.
Figure 3:
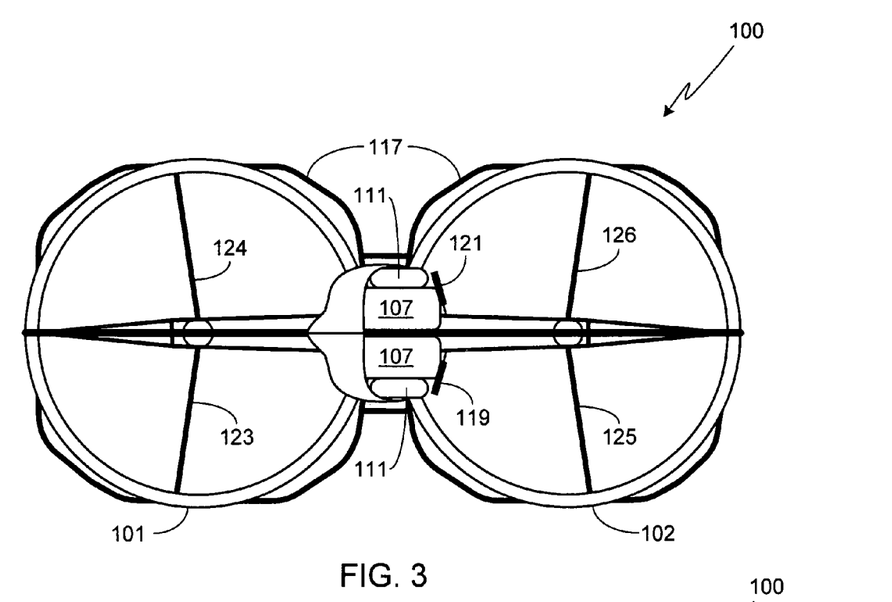
FIG. 3 is a top view of the lift platform shown in FIG. 1.
Figure 4:
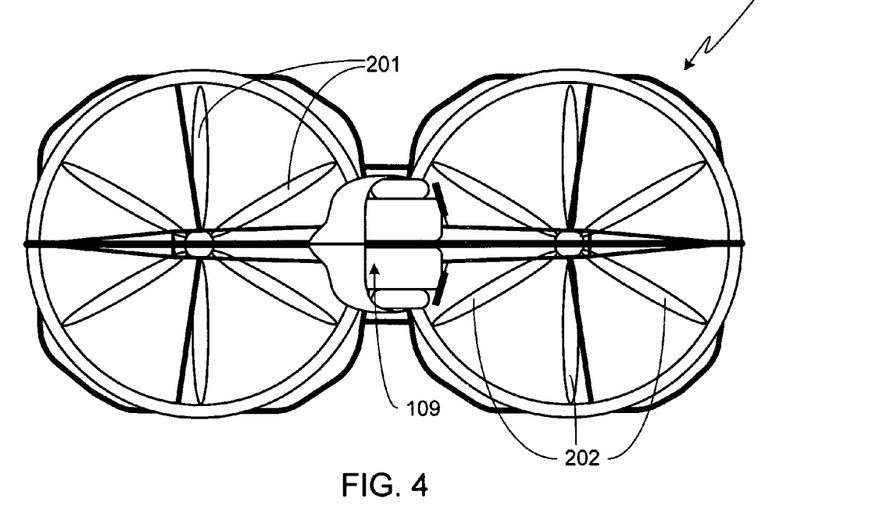
FIG. 4 is the same view of the lift platform shown in FIG. 3, with the addition of the rotors.
Figure 5:
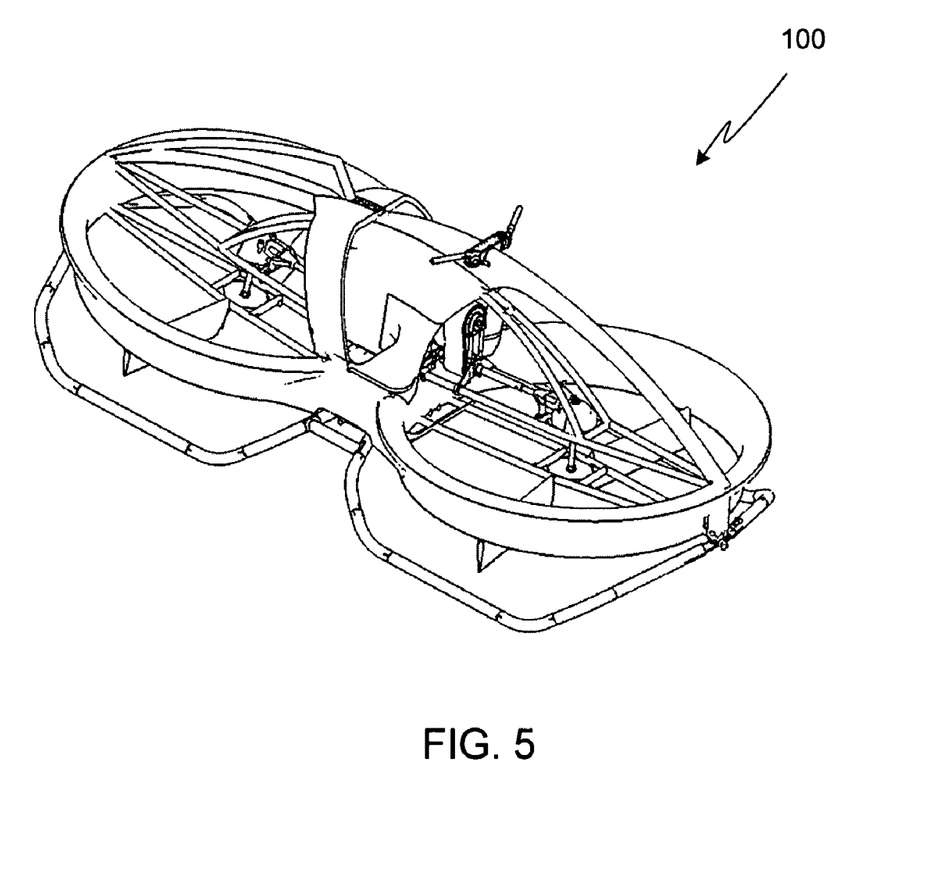
FIG. 5 is a perspective view of the lift platform shown in FIGS. 1-4.

FIGS. 1 and 2 provide side views of a preferred embodiment of a lift platform 100 according to the invention, FIG. 2 including the rotors and the drive system (shown in phantom). FIGS. 3 and 4 show top views of the same lift platform, with and without the rotors. FIG. 5 is a perspective view of lift platform 100.

Platform 100 includes a pair of thrust generating regions located in fore and aft positions within the vehicle. In the preferred and illustrated embodiment, thrust is generated by a pair of tandem-mounted, counter-rotating rotors 201/202 mounted within ducts 101 and 102, respectively, the ducts providing enhanced thrust for a given rotor size, thus allowing the use of smaller rotors. As a result of being able to use smaller rotors for the required vehicle thrust, the rotors can turn at a higher rpm for a given tip speed, thus simplifying gear reduction in the drive train. Additionally, by eliminating the exposed blades of the rotors, ducts 101/102 substantially increase the safety of the platform while decreasing the noise generated by the platform. The rotors are counter-rotating in order to offset yaw effects. Preferably fixed-pitch rotors are used. Thrust is controlled by varying the rotor rotational speed, i.e., throttling the engine. In the preferred embodiment, rotors 201/202 are each 5 feet in diameter and the vehicle is approximately 12 feet in total length.

Although ducts 101/102, and thus rotors 201/202, can be mounted in a horizontal plane, preferably the assemblies are canted in-line on the longitudinal axis as shown. The preferred cant between the ducts is approximately 10 degrees, although larger cant angles can be used. Preferably the cant angle is less than 45 degrees. Canting the rotor/duct assemblies enhances the platform's hovering stability while reducing momentum drag and nose down pitch angle in forward flight.

Preferably rotors 201/202 are coupled to a single drive unit 203 (i.e., motor and transmission) and rotate at the same rate. Drive unit 203, shown in phantom in FIG. 2, is coupled to rotors 201/202 via a pair of drive shafts 103/104 and a pair of gear boxes 105/106. Covering drive unit 203 is an engine cowling 107 which includes a sitting area 109 for the pilot. Although not shown, preferably seat 109 is padded, for example like a motorcycle seat, to provide additional pilot comfort. Cowling 107 is shaped to conform to the stance of a seated pilot. In addition to providing a comfortable sitting position, the cowling allows the pilot to exert additional force on the vehicle during maneuvers by applying force via thigh and knee pressure, much like a horseback or motorcycle rider might do in a similar maneuver.

In addition to cowling 107, foot support plates 111 are used by the pilot to exert force on the platform. Preferably foot support plates 111 are wide enough to allow the pilot to vary his stance during flight, thus allowing the amount of force to be easily and quickly varied by altering on which portions of the support plates pressure is applied by the pilot. Additionally, if desired, each support plate 111 can be equipped with a foot harness, similar to a heel and toe clip used on a ski or snowboard, thus allowing the pilot to exert force on the craft both by pushing down and pulling up with his feet. Although it will be appreciated that cowling 107 and fore and aft support trusses 113 and 115, respectively, can utilize a variety of shapes, preferably they are fabricated from high strength, light weight composites in order to minimize vehicle weight. Mounted to platform 100 are skids 117. Skids 117 are preferably fabricated from tubular aluminum and/or steel components, although composites can also be used in order to minimize weight.

Figure 6:
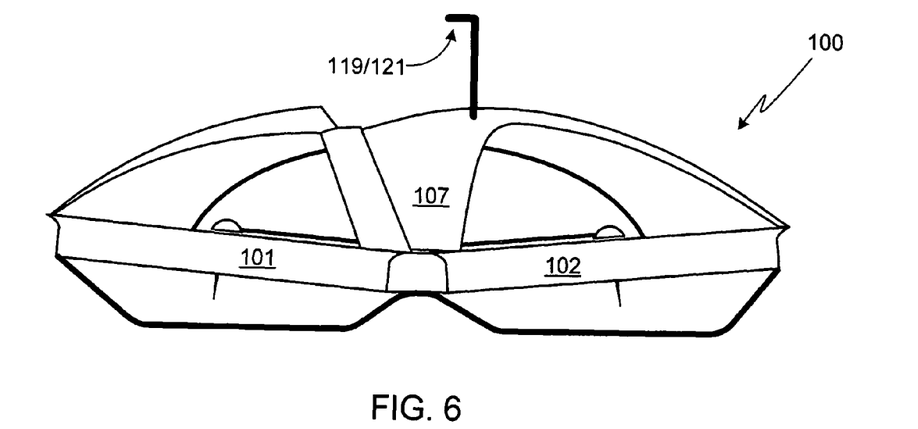
FIG. 6 is the same view of the lift platform shown in FIG. 1, with the control handle bars shown in the extended, upper position.

The tandem rotor configuration utilized by the invention introduces a relatively large moment of inertia about the pitch axis. Accordingly, in order to provide the desired kinesthetic control over the vehicle, the control system must be augmented in such a way that pilot intuition is retained. The inventor has found that the best means of augmenting the desired kinesthetic control is through the use of a pair of control handle bars 119/121 that are linked to means of aerodynamically altering the flow of air from ducts 101/102. As shown and described herein, control handle bar 119 is located on the right side of the lift platform centerline and control handle bar 121 is located on the left side of the lift platform centerline. As will be described in further detail, in the preferred embodiment control handle bars 119/121 must be capable of independent fore/aft movement (also referred to herein as forward/rearward movement). In the preferred embodiment, the control handle bars have separate handbrake style levers to control the engine throttle. In this embodiment, squeezing the right lever increases engine throttle, while squeezing the left lever decreases engine throttle. Additionally, in the preferred embodiment both handle bars are capable of being locked into at least two vertical positions, a lower position as shown in FIG. 1 which is preferred when the pilot is seated, and a raised position as shown in FIG. 6 which is preferred when the pilot is standing. A standing position during flight can be used to improve visibility, for example during landing, or to increase the leverage that the pilot is able to exert on the platform. Preferably the control handle bars can be locked in any of a countless number of positions between the lowermost and the uppermost positions, thus accommodating pilots of varying size.

As previously noted, control handle bars 119/121 are linked to a means of aerodynamically altering the flow of air from ducts 101/102. Preferably mechanical linkage is used, for example a push-pull cable, although other means can be used such as a pneumatic system. Although a variety of means can be used, such as articulating propeller blades, lip-blowing or trailing edge buckets, the inventor has found that the preferred means uses aerodynamic surfaces positioned within the duct downwash. In at least one preferred embodiment, a pair of such surfaces is used within each duct, specifically control surfaces 123/124 within duct 101 and surfaces 125/126 within duct 102. As shown, the control surfaces extend radially outward from the center, approximately 12 degrees off the lateral axis. As will be described further below, control handle 119 actuates control surface 126 when pushed forward, and actuates control surface 124 when pulled back. Similarly, control handle 121 actuates control surface 125 when pushed forward, and actuates control surface 123 when pulled back.

As the primary elements/components of the preferred design have been described, further details relating to the operation of the vehicle will now be provided.

Figure 7:
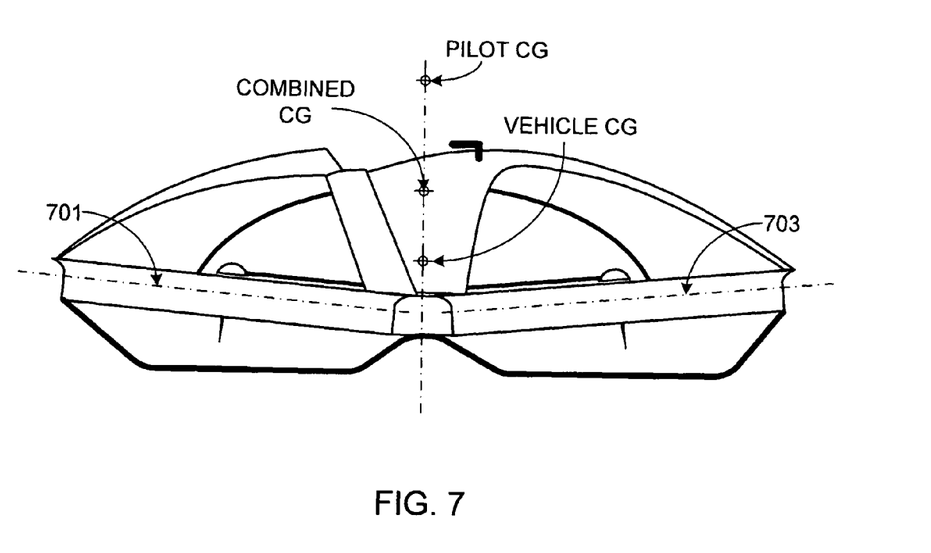
FIG. 7 is the same view of the lift platform shown in FIG. 1, with the lift planes and the center of gravity shown.

In order to utilize kinesthetic control, vehicle 100 must be designed to meet certain criteria. First, as shown in FIG. 7, the plane of lift (i.e., lift planes 701 and 703) must be below the pilot's center of gravity (CG), and preferably below the plane of his feet. Second, as the ratio of the pilot's body mass to the mass of the vehicle determines how responsive and controllable the vehicle is to the pilot's control, vehicle inertia and mass must be kept low. Third, the platform must be balanced with the pilot situated approximately at its center of lift as illustrated in FIG. 7.

Pitch

Forward flight is achieved by a nose-down pitch, as this points the thrust vector down and aft. Rearward flight, or deceleration from forward flight, is achieved by a nose-up pitch which points the thrust vector down and forward. Due to the tandem configuration of the ducted rotors, however, the vehicle's moment of inertia is too large for the pilot to achieve the desired level of pitch control via kinesthetic control alone. Accordingly the control surfaces coupled to the control handle bars must be used to augment the kinesthetic control.

Figure 8:
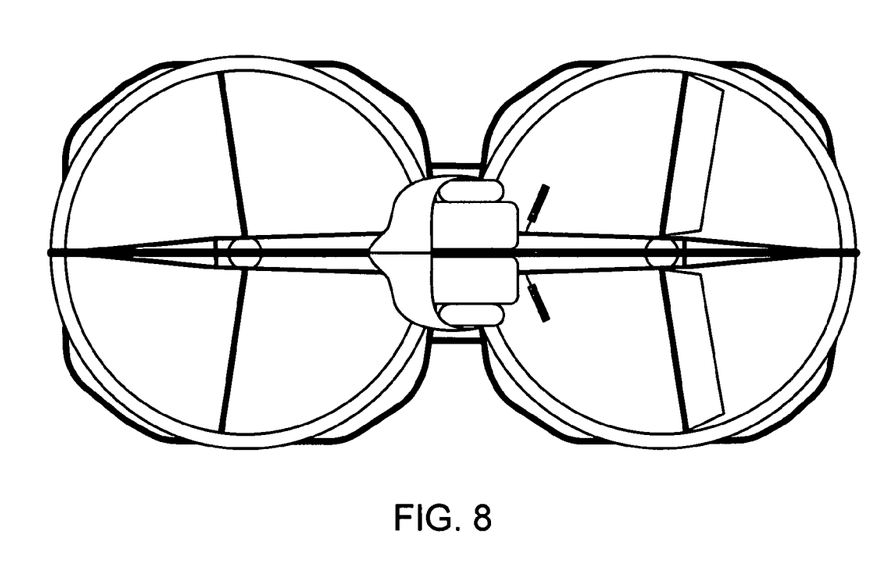
FIG. 8 is the same view of the lift platform shown in FIG. 3, with the forward control surfaces actuated for a pitch-down maneuver.
Figure 9:
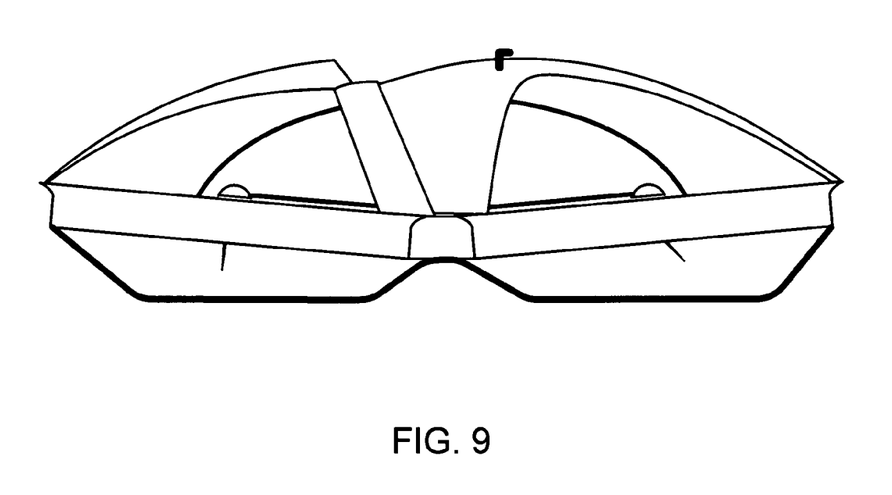
FIG. 9 is the same view of the lift platform shown in FIG. 1, with the forward control surfaces actuated for a pitch-down maneuver.

To achieve forward flight using the system of the invention, the pilot pushes forward on both control handle bars 119 and 121 as illustrated in FIG. 8. In addition to inducing the pilot to move his center of gravity forward, pushing control handle bars 119 and 121 forward moves control surfaces 125 and 126 toward an increasingly negative angle-of-attack with respect to the downwash as illustrated in FIGS. 8 and 9. As a result, negative lift is generated and drag is induced, thereby causing a downward pitch as desired for forward flight.

Figure 10:
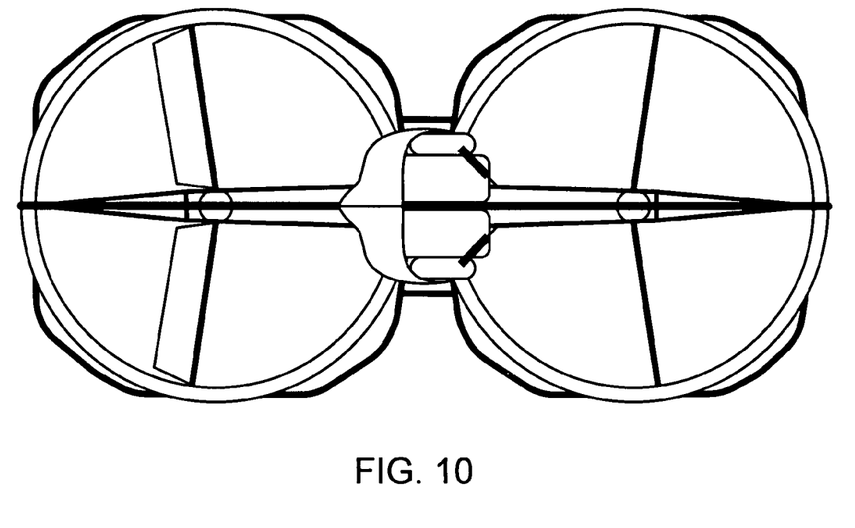
FIG. 10 is the same view of the lift platform shown in FIG. 3, with the rear control surfaces actuated for a pitch-up maneuver.
Figure 11:
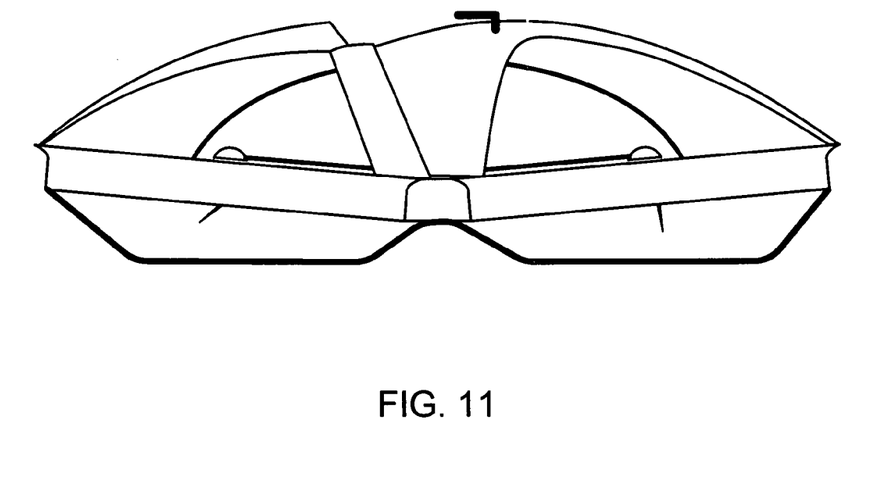
FIG. 11 is the same view of the lift platform shown in FIG. 1, with the rear control surfaces actuated for a pitch-up maneuver.

To achieve rearward flight, or deceleration from forward flight, the pilot intuitively leans back, thereby pulling back on both control handle bars 119 and 121 as illustrated in FIG. 10. In addition to changing the moving the pilot's center of gravity backwards, pulling control handle bars 119 and 121 backwards moves control surfaces 123 and 124 toward an increasingly negative angle-of-attack with respect to the downwash as illustrated in FIGS. 10 and 11. As a result, upward pitch is induced as desired for rearward flight or deceleration.

In the preferred embodiment of the invention, the control surfaces of the invention significantly impact the ability of the pilot to kinesthetically control the pitch of the platform. Without use of the control surfaces a 180 pound pilot, who is standing on the craft as opposed to sitting in order to maximize their control, will only generate about 90 foot-pounds of moment. By locking the pilot's feet to the platform, this number approaches 270 foot-pounds. Augmenting the forward movement of the pilot through the control handle bars and control surfaces as described above, an additional 900 foot-pounds of pitching moment is generated. This effect is largely due to the high downward velocity passing through the duct and the large moment arm to the lift vector. An additional benefit of the augmented control system offered by the present invention is that the control provided by the control surfaces is almost instantaneous, as opposed to the control provided by the unaugmented pilot's kinesthetic movement which is much slower due to the required movement of body mass while maintaining balance.

Although the use of the control handle bars and the control surfaces provide an almost instantaneous increase in the force applied during pitch-up/pitch-down maneuvers, typically they are only required to initiate a change in attitude. Once the change has been initiated, the control handle bars, and thus the control surfaces, can be returned to the neutral position after which the pilot's weight and balance maintain the desired attitude. During sustained flight, after the desired attitude has been achieved, the pilot can augment their control using the control handle bars and control surfaces.

Yaw

Figure 12:
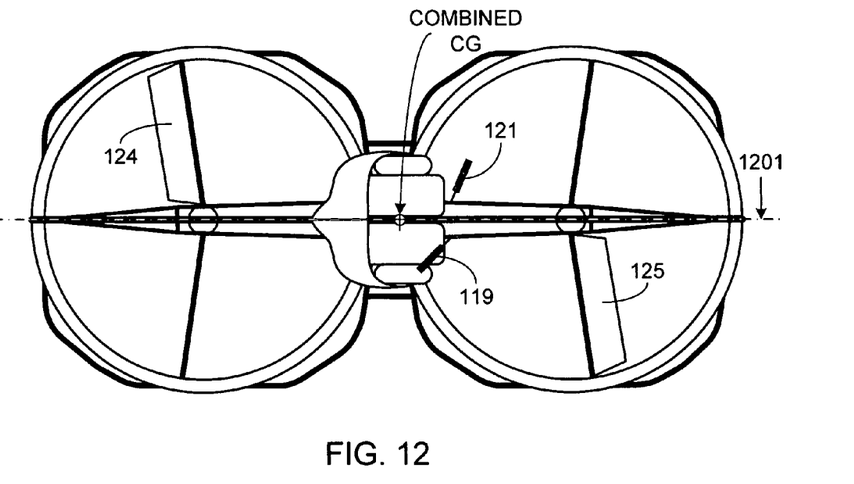
FIG. 12 is the same view of the lift platform shown in FIG. 3, with the control surfaces actuated for a yaw-right maneuver.
Figure 13:
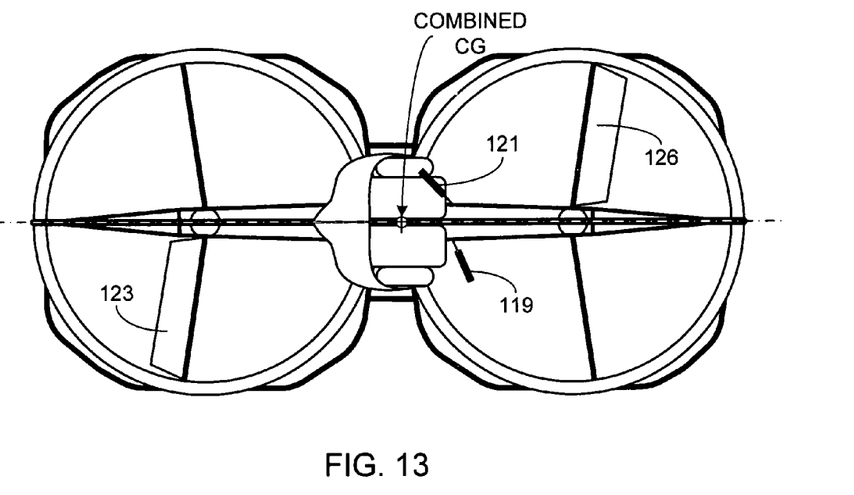
FIG. 13 is the same view of the lift platform shown in FIG. 3, with the control surfaces actuated for a yaw-left maneuver.

To initiate a yaw maneuver, the pilot simultaneously moves control handle bars 119/121 in opposing directions, thus mimicking the movement of a bicycle handle bar. Accordingly, to yaw right the pilot pushes left control handle bar 121 while pulling right control handle bar 119 as shown in FIG. 12, thereby causing actuation of control surfaces 125 and 124, respectively. Similarly, to yaw left the pilot pushes right control handle bar 119 while pulling left control handle bar 121 as shown in FIG. 13, thereby causing actuation of control surfaces 126 and 123, respectively. Note that during these maneuvers, and as shown in FIGS. 12 and 13, the pilot maintains their center-of-gravity (CG) above the centerline 1201 of the platform, thus maintaining the combined CG above centerline 1201.

Roll

Figure 14:
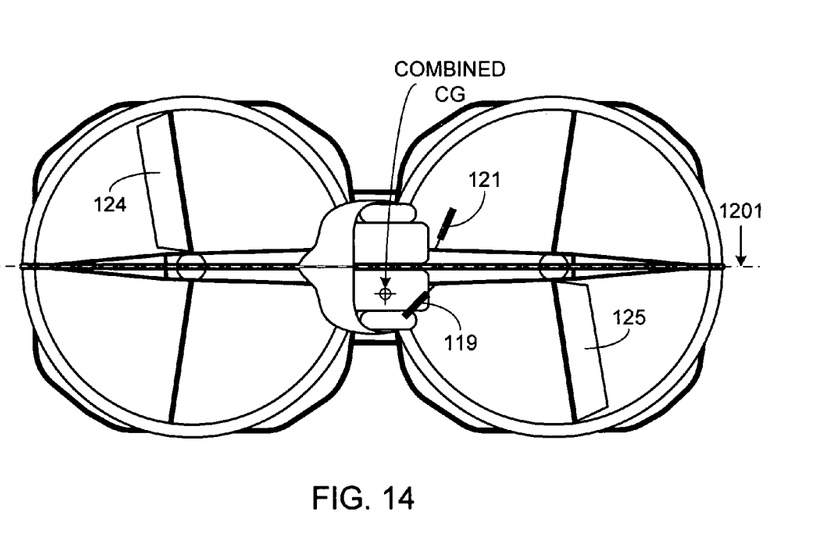
FIG. 14 is the same view of the lift platform shown in FIG. 3, with the control surfaces actuated for a roll-right maneuver.
Figure 15:
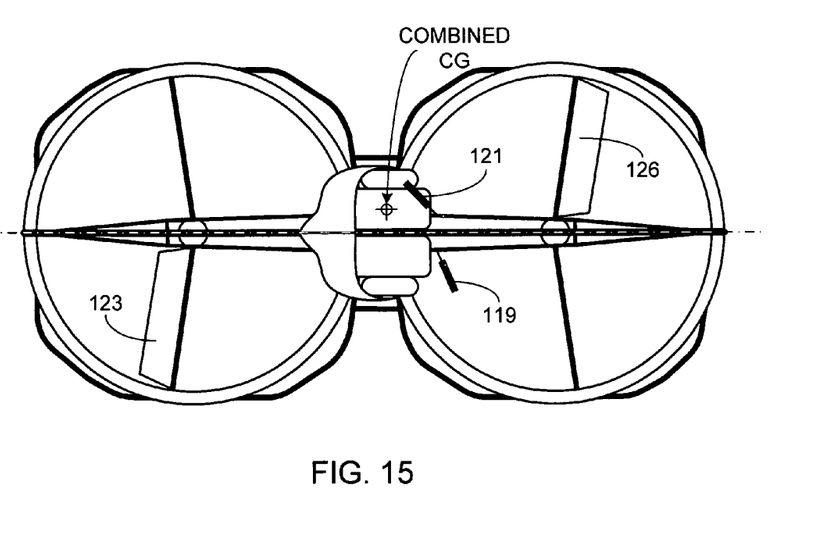
FIG. 15 is the same view of the lift platform shown in FIG. 3, with the control surfaces actuated for a roll-left maneuver.

To initiate a roll maneuver, the pilot moves the control handle bars as required for a yaw maneuver in the same direction while simultaneously shifting his weight, and thus the combined CG, in the desired direction. Accordingly, to roll right the pilot pushes left control handle bar 121, pulls right control handle bar 119, and shifts his weight to the right as shown in FIG. 14. Similarly, to roll left the pilot pushes right control handle bar 119, pulls left control handle bar 121, and shifts his weight to the left as shown in FIG. 15.

Due to the lift plane of the platform being below its center of gravity, if the platform is already moving forward there is a second way in which roll maneuvers can be initiated. Specifically, in order to initiate a roll and turn to the left, the pilot can command a quick right yaw maneuver as outlined above, thereby inducing an overturning moment of the vehicle's center of gravity. Thus when yaw returns to neutral, a left roll and a turn to the left is induced. Similarly, in order to initiate a roll and turn to the right, the pilot can command a quick left yaw maneuver as outlined above, thereby inducing an overturning moment of the vehicle's center of gravity. Thus when yaw returns to neutral, a right roll and a turn to the right is induced. To exit the roll/turn, the process is reversed. The ability to make such a maneuver is especially useful for unmanned vehicle operation since it allows such maneuvers to be performed by a platform with a fixed center of gravity, i.e., a moveable ballast weight is not required as with other kinesthetic platform control systems.

Figure 16:
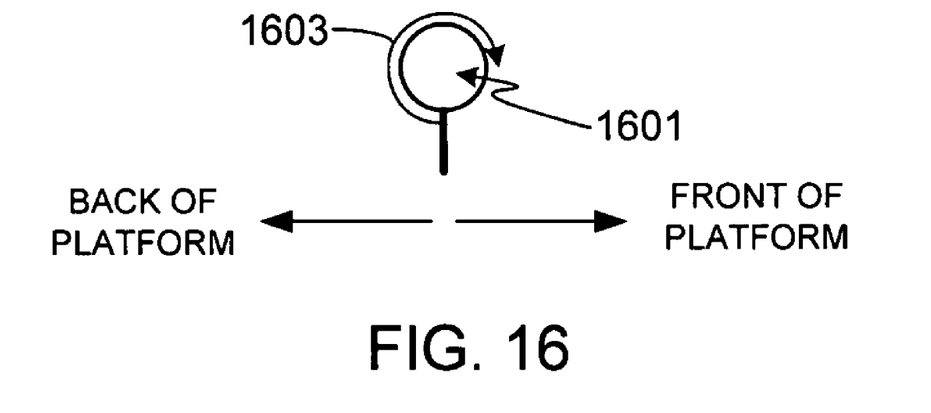
FIG. 16 illustrates movement of a twisting control handle bar.
Figure 17:
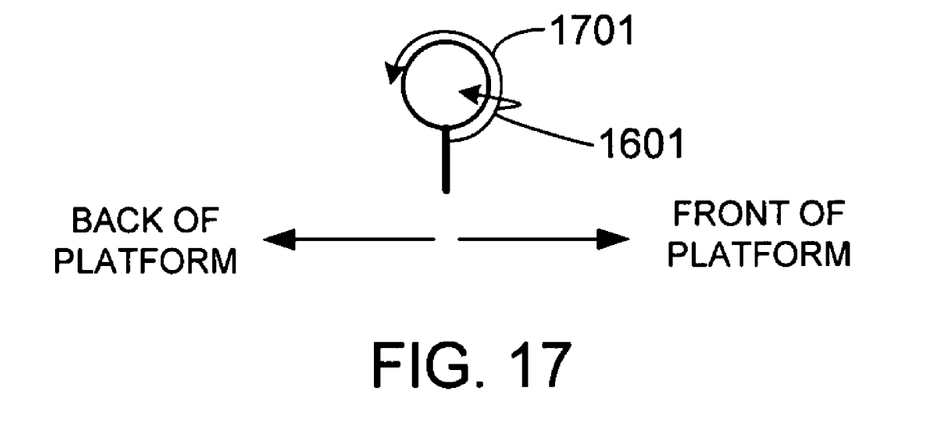
FIG. 17 illustrates the counter movement of the twisting control handle bar of FIG. 16.

It will be appreciated that the kinesthetic control system of the invention is not limited to rotor-driven platforms, but can also be used with platforms using other air lift systems, e.g., rockets, turbines, etc. Additionally, it will be appreciated that while the control surfaces described above are preferred as they are easy to implement and provide the desired degree of vehicle control, other means can be used such as a single split spoiler mounted longitudinally under each duct extending radially outward from the center. Additionally, it will be appreciated that the control handle bars are not limited to push/pull handles as described above in the preferred embodiment. For example, instead of using control handle bars that the pilot pushes or pulls on, the invention can use twisting control handle bars. In order to retain the kinesthetic approach of the invention, the pilot would twist the control handles over the 'top' of the handles (i.e., forward twisting motion) to duplicate the forward pushing of the control handles, and twist the handles back 'under' the handles (i.e., backward twisting motion) to duplicate pulling the control handles. Thus control handle 1601 would be twisted forward, i.e., rotated in a direction 1603 as shown in FIG. 16, relative to the platform to go forwards, and twisted backward, i.e., rotated in a direction 1701 at shown in FIG. 17, relative to the platform to go backwards.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. An augmented kinesthetic control system, comprising:
a lift platform comprising a first rotor mounted within a first duct and located in a fore position in said lift platform, a second rotor mounted within a second duct and located in an aft position in said lift platform, wherein said first and second positions are longitudinally spaced, wherein said first and second positions are centered on a lift platform centerline, wherein a first lift plane defined by said first rotor is below a lift platform center of gravity, and wherein a second lift plane defined by said second rotor is below said lift platform center of gravity;
a first control surface mounted within a first duct downwash corresponding to said first duct, wherein said first control surface is mounted to the right of said lift platform centerline, and wherein actuation of said first control surface generates negative lift in said first duct to the right of the lift platform centerline;
a second control surface mounted within a second duct downwash corresponding to said second duct, wherein said second control surface is mounted to the right of said lift platform centerline, wherein actuation of said second control surface generates negative lift in said second duct to the right of the lift platform centerline, and wherein actuation of said second control surface is independent of actuation of said first control surface;
a third control surface mounted within said first duct downwash corresponding to said first duct, wherein said third control surface is mounted to the left of said lift platform centerline, wherein actuation of said third control surface generates negative lift in said first duct to the left of the lift platform centerline, and wherein actuation of said third control surface is independent of actuation of said first and second control surfaces;
a fourth control surface mounted within said second duct downwash corresponding to said second duct, wherein said fourth control surface is mounted to the left of said lift platform centerline, wherein actuation of said fourth control surface generates negative lift in said second duct to the left of the lift platform centerline, and wherein actuation of said fourth control surface is independent of actuation of said first, second and third control surfaces;
a first control handle bar coupled to said first and second control surfaces and configured to allow forward movement from a first control handle bar neutral position and configured to allow rearward movement from said first control handle bar neutral position, wherein said first control handle bar is located to the left of said lift platform centerline, wherein forward movement of said first control handle bar from said first control handle bar neutral position actuates said first control surface, and wherein rearward movement of said first control handle bar from said first control handle bar neutral position actuates said second control surface;

a second control handle bar coupled to said third and fourth control surfaces and configured to allow forward movement from a second control handle bar neutral position and configured to allow rearward movement from said second control handle bar neutral position, wherein said second control handle bar is located to the right of said lift platform centerline, wherein forward movement of said second control handle bar from said second control handle bar neutral position actuates said third control surface, and wherein rearward movement of said second control handle bar from said second control handle bar neutral position actuates said fourth control surface;

wherein lift platform downward pitch is induced when said first control handle bar is moved forward from said first control handle bar neutral position and said second control handle bar is moved forward from said second control handle bar neutral position;

wherein lift platform upward pitch is induced when said first control handle bar is moved rearward from said first control handle bar neutral position and said second control handle bar is moved rearward from said second control handle bar neutral position;

wherein lift platform yaw right is induced when said first control handle bar is moved forward from said first control handle bar neutral position and said second control handle bar is moved rearward from said second control handle bar neutral position; and wherein lift platform yaw left is induced when said first control handle bar is moved rearward from said first control handle bar neutral position and said second control handle bar is moved forward from said second control handle bar neutral position.

2. The augmented kinesthetic control system of claim 1, said first and third control surfaces extending radially from a first duct axis, and said second and fourth control surfaces extending radially from a second duct axis.

3. The augmented kinesthetic control system of claim 2, wherein said first and third control surfaces are angled away from a lift platform lateral axis, and wherein said second and fourth control surfaces are angled away from said lift platform lateral axis.

4. The augmented kinesthetic control system of claim 2, wherein said first and third control surfaces are angled away from a lift platform lateral axis by approximately 12 degrees, and wherein said second and fourth control surfaces are angled away from said lift platform lateral axis by approximately 12 degrees.

5. The augmented kinesthetic control system of claim 1, further comprising means for shifting said lift platform center of gravity, wherein lift platform roll right is induced when said first control handle bar is moved forward from said first control handle bar neutral position, said second control handle bar is moved rearward from said second control handle bar neutral position, and said center of gravity is shifted to the right of said lift platform centerline by said means for shifting said lift platform center of gravity; and wherein lift platform roll left is induced when said first control handle bar is moved rearward from said first control handle bar neutral position, said second control handle bar is moved forward from said second control handle bar neutral position, and said center of gravity is shifted to the left of said lift platform centerline by said means for shifting said lift platform center of gravity.

6. The augmented kinesthetic control system of claim 1, wherein said first control handle bar is configured to be adjustable between at least a first vertical position and a second vertical position, wherein said first vertical position is lower than said second vertical position relative to said first and second lift planes, and wherein said second control handle bar is configured to be adjustable between at least said first vertical position and said second vertical position.

7. The augmented kinesthetic control system of claim 1, further comprising a drive system coupled to said first and second rotors, a throttle control coupled to at least one of said first control handle bar and said second control handle bar, a drive system cowling that defines a pilot seating region, and a pair of foot support plates.

8. The augmented kinesthetic control system of claim 1, said first rotor comprising a first fixed pitch propeller, and said second rotor comprising a second fixed pitch propeller.

9. The augmented kinesthetic control system of claim 1, wherein said first and second rotors are canted in-line on the lift platform centerline.

10. The augmented kinesthetic control system of claim 1, wherein increasing the forward distance of said first control handle bar from said first control handle bar neutral position increases a first control surface negative angle-of-attack with respect to said first duct downwash, wherein increasing the rearward distance of said first control handle bar from said first control handle bar neutral position increases a second control surface negative angle-of-attack with respect to said second duct downwash, wherein increasing the forward distance of said second control handle bar from said second control handle bar neutral position increases a third control surface negative angle-of-attack with respect to said first duct downwash, and wherein increasing the rearward distance of said second control handle bar from said second control handle bar neutral position increases a fourth control surface negative angle-of-attack with respect to said second duct downwash.

11. An augmented kinesthetic control system, comprising:
a lift platform comprising a first rotor mounted within a first duct and located in a fore position in said lift platform, a second rotor mounted within a second duct and located in an aft position in said lift platform, wherein said first and second positions are longitudinally spaced, wherein said first and second positions are centered on a lift platform centerline, wherein a first lift plane defined by said first rotor is below a lift platform center of gravity, and wherein a second lift plane defined by said second rotor is below said lift platform center of gravity;

a first control surface mounted within a first duct downwash corresponding to said first duct, wherein said first control surface is mounted to the right of said lift platform centerline, and wherein actuation of said first control surface generates negative lift in said first duct to the right of the lift platform centerline;

a second control surface mounted within a second duct downwash corresponding to said second duct, wherein said second control surface is mounted to the right of said lift platform centerline, wherein actuation of said second control surface generates negative lift in said second duct to the right of the lift platform centerline, and wherein actuation of said second control surface is independent of actuation of said first control surface;

a third control surface mounted within said first duct downwash corresponding to said first duct, wherein said third control surface is mounted to the left of said lift platform centerline, wherein actuation of said third control surface generates negative lift in said first duct to the left of the lift platform centerline, and wherein actuation of said third control surface is independent of actuation of said first and second control surfaces;

a fourth control surface mounted within said second duct downwash corresponding to said second duct, wherein said fourth control surface is mounted to the left of said lift platform centerline, wherein actuation of said fourth control surface generates negative lift in said second duct to the left of the lift platform centerline, and wherein actuation of said fourth control surface is independent of actuation of said first, second and third control surfaces;

a first control handle bar coupled to said first and second control surfaces and configured to allow a forward twisting motion from a first control handle bar neutral position and configured to allow a rearward twisting motion from said first control handle bar neutral position, wherein said first control handle bar is located to the left of said lift platform centerline, wherein forward twisting of said first control handle bar from said first control handle bar neutral position actuates said first control surface, and wherein rearward twisting of said first control handle bar from said first control handle bar neutral position actuates said second control surface;

a second control handle bar coupled to said third and fourth control surfaces and configured to allow a forward twisting motion from a second control handle bar neutral position and configured to allow a rearward twisting motion from said second control handle bar neutral position, wherein said second control handle bar is located to the right of said lift platform centerline, wherein forward twisting of said second control handle bar from said second control handle bar neutral position actuates said third control surface, and wherein rearward twisting of said second control handle bar from said second control handle bar neutral position actuates said fourth control surface;

wherein lift platform downward pitch is induced when said first control handle bar is twisted forward from said first control handle bar neutral position and said second control handle bar is twisted forward from said second control handle bar neutral position;

wherein lift platform upward pitch is induced when said first control handle bar is twisted rearward from said first control handle bar neutral position and said second control handle bar is twisted rearward from said second control handle bar neutral position;

wherein lift platform yaw right is induced when said first control handle bar is twisted forward from said first control handle bar neutral position and said second control handle bar is twisted rearward from said second control handle bar neutral position; and wherein lift platform yaw left is induced when said first control handle bar is twisted rearward from said first control handle bar neutral position and said second control handle bar is twisted forward from said second control handle bar neutral position.

12. The augmented kinesthetic control system of claim 11, said first and third control surfaces extending radially from a first duct axis, and said second and fourth control surfaces extending radially from a second duct axis.

13. The augmented kinesthetic control system of claim 12, wherein said first and third control surfaces are angled away from a lift platform lateral axis, and wherein said second and fourth control surfaces are angled away from said lift platform lateral axis.

14. The augmented kinesthetic control system of claim 12, wherein said first and third control surfaces are angled away from a lift platform lateral axis by approximately 12 degrees, and wherein said second and fourth control surfaces are angled away from said lift platform lateral axis by approximately 12 degrees.

15. The augmented kinesthetic control system of claim 11, further comprising means for shifting said lift platform center of gravity, wherein lift platform roll right is induced when said first control handle bar is twisted forward from said first control handle bar neutral position, said second control handle bar is twisted rearward from said second control handle bar neutral position, and said center of gravity is shifted to the right of said lift platform centerline by said means for shifting said lift platform center of gravity; and wherein lift platform roll left is induced when said first control handle bar is twisted rearward from said first control handle bar neutral position, said second control handle bar is twisted forward from said second control handle bar neutral position, and said center of gravity is shifted to the left of said lift platform centerline by said means for shifting said lift platform center of gravity.

16. The augmented kinesthetic control system of claim 11, wherein said first control handle bar is configured to be adjustable between at least a first vertical position and a second vertical position, wherein said first vertical position is lower than said second vertical position relative to said first and second lift planes, and wherein said second control handle bar is configured to be adjustable between at least said first vertical position and said second vertical position.

17. The augmented kinesthetic control system of claim 11, further comprising a drive system coupled to said first and second rotors, a throttle control coupled to at least one of said first control handle bar and said second control handle bar, a drive system cowling that defines a pilot seating region, and a pair of foot support plates.

18. The augmented kinesthetic control system of claim 11, said first rotor comprising a first fixed pitch propeller, and said second rotor comprising a second fixed pitch propeller, and wherein said first and second rotors are canted in-line on the lift platform centerline.

19. The augmented kinesthetic control system of claim 11, wherein increasing the forward twisting motion of said first control handle bar from said first control handle bar neutral position increases a first control surface negative angle-of-attack with respect to said first duct downwash, wherein increasing the rearward twisting motion of said first control handle bar from said first control handle bar neutral position increases a second control surface negative angle-of-attack with respect to said second duct downwash, wherein increasing the forward twisting motion of said second control handle bar from said second control handle bar neutral position increases a third control surface negative angle-of-attack with respect to said first duct downwash, and wherein increasing the rearward twisting motion of said second control handle bar from said second control handle bar neutral position increases a fourth control surface negative angle-of-attack with respect to said second duct downwash.

* * * * *